(12) United States Patent
Rozman et al.

(10) Patent No.: US 10,541,598 B1
(45) Date of Patent: Jan. 21, 2020

(54) DC POWER GENERATING SYSTEM WITH VOLTAGE RIPPLE COMPENSATION

(71) Applicant: Hamilton Sundstrand Corporation, Charlotte, NC (US)

(72) Inventors: Gregory I. Rozman, Myrtle Beach, SC (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/054,689

(22) Filed: Aug. 3, 2018

(51) Int. Cl.
| | |
|---|---|
| *H02M 1/14* | (2006.01) |
| *H02M 1/42* | (2007.01) |
| *H02M 1/15* | (2006.01) |
| *H02P 9/10* | (2006.01) |
| *H02P 9/30* | (2006.01) |
| *H02M 7/219* | (2006.01) |
| *H02M 1/12* | (2006.01) |

(52) U.S. Cl.
CPC ............ *H02M 1/15* (2013.01); *H02M 1/4233* (2013.01); *H02P 9/10* (2013.01); *H02P 9/305* (2013.01); *H02M 1/12* (2013.01); *H02M 7/219* (2013.01)

(58) Field of Classification Search
CPC .... H02M 3/1582; H02M 5/4585; H02M 1/14; H02M 1/12; H02M 1/44; H02M 7/04; H02M 1/15; H02M 1/143; H02M 1/4208; H02M 1/4216; H02M 1/4225; H02M 1/4233; H02M 1/4258; H02M 7/2176; H02M 7/219; H02P 27/08; H02P 27/085; H02P 2201/09; H02P 9/10; H02P 9/305
See application file for complete search history.

(56) References Cited

U.S. PATENT DOCUMENTS

| | | | | |
|---|---|---|---|---|
| 5,140,245 | A * | 8/1992 | Stacey | ................... G08C 19/42 318/723 |
| 5,218,520 | A | 6/1993 | Rozman et al. | |
| 7,408,327 | B2 | 8/2008 | Shah et al. | |
| 7,859,230 | B2 | 12/2010 | Rozman et al. | |
| 8,378,641 | B2 | 2/2013 | Rozman et al. | |
| 9,059,647 | B2 | 6/2015 | Rozman et al. | |
| 2002/0149953 | A1 * | 10/2002 | Smedley | .................... H02J 3/01 363/84 |
| 2003/0107349 | A1 * | 6/2003 | Haydock | ................. H02J 9/062 322/28 |
| 2003/0218887 | A1 * | 11/2003 | Kojori | ................... H02M 7/797 363/16 |
| 2010/0295383 | A1 * | 11/2010 | Cummings | ....... H01L 31/02021 307/151 |
| 2012/0126758 | A1 | 5/2012 | Fang et al. | |

(Continued)

*Primary Examiner* — Gustavo A Rosario-Benitez
(74) *Attorney, Agent, or Firm* — Cantor Colburn LLP

(57) ABSTRACT

A method and system for providing voltage ripple compensation in a DC power generation system. The system includes a permanent magnet generator (PMG) and a passive rectifier in operable communication with the PMG. The system also includes a boost converter in operable communication with the passive rectifier and a controller in electrical communication with the boost converter. The controller is configured to cause the boost converter to supply a DC bus and to control the boost converter based on a voltage compensation signal to the boost converter to reduce voltage ripple on the voltage of the DC bus.

18 Claims, 6 Drawing Sheets

(56) References Cited

U.S. PATENT DOCUMENTS

| | | | |
|---|---|---|---|
| 2013/0181646 A1* | 7/2013 | Takata | H02M 1/12 318/400.29 |
| 2013/0181654 A1* | 7/2013 | Rozman | H02M 5/4585 318/721 |
| 2015/0016159 A1* | 1/2015 | Deboy | H02J 3/383 363/71 |
| 2015/0021914 A1 | 1/2015 | Kim | |
| 2015/0354881 A1* | 12/2015 | Park | F24F 11/30 62/228.1 |
| 2016/0248318 A1* | 8/2016 | Ishizeki | H02M 1/14 |
| 2018/0131254 A1 | 5/2018 | Rozman et al. | |

* cited by examiner

DC POWER GENERATING SYSTEM WITH VOLTAGE RIPPLE COMPENSATION

BACKGROUND

Exemplary embodiments generally pertain to the field of electric power generating systems (EPGS), and more particularly to high voltage direct current (DC) power generation with active voltage ripple compensation.

Generally, a conventional DC power generating system utilizes a variable-speed permanent magnet synchronous generator (PMG) and an active rectifier. PMG typically offers high efficiency and high power density in comparison with a wound-field synchronous generator construction. However, the size of the conventional 2-level six switching device active rectifier often requires large size passive components, such as electromagnetic interference (EMI) filters, DC link capacitor(s) and output power quality filter (s). To achieve a high power density multilevel topologies, such as Vienna Rectifier, have been considered to achieve low harmonic distortion with moderate switching frequency and reduced EMI emissions compared to a standard 2-level active rectifier/inverter. However, this approach may require the use of custom SiC power modules resulting in a higher system cost. Another approach is to use a conventional six-pulse passive rectifier coupled with a DC-DC boost converter. This approach, however, typically exhibits a large voltage ripple at 6-times of PMG fundamental frequency. In many applications such voltage ripple may be considered objectionable. To that end, there is a need for a high voltage (270Vdc) mid (~10 kW) power generating system employing a PMG and a high frequency power converter into an affordable high power density alternator that exhibits good power quality.

BRIEF DESCRIPTION

Disclosed herein is a method and system for providing voltage ripple compensation in a DC power generation system. The system includes a permanent magnet generator (PMG) and a passive rectifier in operable communication with the PMG. The system also includes a boost converter in operable communication with the passive rectifier and a controller in electrical communication with the boost converter. The controller is configured to cause the boost converter to supply a DC bus and to control the boost converter based on a voltage compensation signal to the boost converter to reduce voltage ripple on the voltage of the DC bus.

In addition to one or more of the features described above, or as an alternative, further embodiments may include that the controller includes a current regulator in electrical communication with the boost converter, and the current regulator is configured to provide a pulse width modulation (PWM) scheme to the boost converter based on d-q components of feedback voltage harmonics of the boost converter.

In addition to one or more of the features described above, or as an alternative, further embodiments may include that the controller further includes a voltage regulator in communication with the current regulator, wherein the voltage regulator is configured to provide a compensated reference current to the current regulator.

In addition to one or more of the features described above, or as an alternative, further embodiments may include that the controller further includes an electrical angle estimator in communication with the PMG and the current regulator, and wherein the electrical angle estimator is configured to estimate at least an angle of power generated at the PMG.

In addition to one or more of the features described above, or as an alternative, further embodiments may include that the voltage regulator is in communication with the electrical angle estimator, and wherein the voltage regulator is configured to provide quadrature components of a feedback voltage output harmonics at the boost converter to the current regulator, the quadrature components of the feedback voltage output harmonics being based on the estimated electrical angle of the PMG and the feedback voltage.

In addition to one or more of the features described above, or as an alternative, further embodiments may include that the controller further includes a pulse width modulation (PWM) modulator in communication with the current regulator and the boost converter, the PWM modulator configured to control the boost converter based on a compensated reference current and a current of the boost converter.

In addition to one or more of the features described above, or as an alternative, further embodiments may include that the current regulator is configured to provide a pulse width modulation (PWM) scheme to the boost converter through regulation of the boost converter current.

In addition to one or more of the features described above, or as an alternative, further embodiments may include that the current regulator is configured provide to a pulse width modulation (PWM) scheme to the boost converter based on proportional—integral of current errors of the of the boost converter.

In addition to one or more of the features described above, or as an alternative, further embodiments may include that the voltage regulator comprises a phase locked loop configured to generate an electrical angle of the PMG based on a position sensor associated with the PMG and a number of pole-pairs in the PMG.

In addition to one or more of the features described above, or as an alternative, further embodiments may include that the voltage regulator comprises a harmonic selector configured to select a harmonic of a plurality of harmonics of a voltage generated by the PMG to be compensated.

In addition to one or more of the features described above, or as an alternative, further embodiments may include that the voltage regulator comprises a voltage ripple harmonic selector, the voltage ripple harmonic selector configured to select a harmonic of a plurality of harmonics associated with the voltage generated by the PMG after passive rectification and generate a compensation signal based on the PMG electrical angle and the voltage of the DC bus.

In addition to one or more of the features described above, or as an alternative, further embodiments may include that the voltage ripple compensation signal is a summation of voltage compensation signals for each harmonic of a plurality of harmonics selected.

In addition to one or more of the features described above, or as an alternative, further embodiments may include that the PMG is a three phase generator and the passive rectifier is a six-pulse rectifier.

Also described herein in another embodiment is a method for providing voltage ripple compensation in a DC power generation system having a permanent magnet generator (PMG). The method includes operably connecting a passive rectifier to the PMG, operably connecting a boost converter to the passive rectifier, and operably connecting a controller in electrical communication with the PMG and boost converter. The controller is configured to execute a process to cause the boost converter to supply a DC bus and wherein the controller is configured to control the boost converter based on a voltage compensation signal to the boost converter to reduce voltage ripple on the voltage of the DC bus.

In addition to one or more of the features described above, or as an alternative, further embodiments may include the controller executing includes a current regulator function, and wherein the current regulator is configured to provide a pulse width modulation (PWM) scheme to the boost converter based on quadrature components of feedback voltage harmonics of the boost converter, and wherein the controller further includes a voltage regulator function in communication with the current regulator function. The voltage regulator function is configured to provide a compensated reference current to the current regulator, and wherein the controller further includes an electrical angle estimator function, the electrical angle estimator function configured to estimate at least an angle of power generated at the PMG, and the voltage regulator function communicates with the electrical angle estimator function, and the voltage regulator function provides quadrature components of a feedback voltage output harmonics at the boost converter to the current regulator, the quadrature components of the feedback voltage output harmonics being based on the estimated electrical angle of the PMG and the feedback voltage.

In addition to one or more of the features described above, or as an alternative, further embodiments may include a pulse width modulation (PWM) modulator function in communication with the current regulator and the boost converter, the PWM modulator function configured to control the boost converter based on a compensated reference current and a current of the boost converter.

In addition to one or more of the features described above, or as an alternative, further embodiments may include configuring the current regulator function to provide a pulse width modulation (PWM) scheme to the boost converter through regulation of the boost converter current.

In addition to one or more of the features described above, or as an alternative, further embodiments may include configuring the current regulator function to provide a pulse width modulation (PWM) scheme to the boost converter based on proportional—integral of current errors of the of the boost converter.

In addition to one or more of the features described above, or as an alternative, further embodiments may include that the voltage regulator function comprises a phase locked loop configured to generate an electrical angle of the PMG based on a position sensor associated with the PMG and a number of pole-pairs in the PMG.

In addition to one or more of the features described above, or as an alternative, further embodiments may include that the voltage regulator function comprises a harmonic selector configured to select a harmonic of a plurality of harmonics of a voltage generated by the PMG after passive rectification to be compensated.

In addition to one or more of the features described above, or as an alternative, further embodiments may include that the voltage regulator function comprises a voltage ripple harmonic selector, the voltage ripple harmonic selector configured to select a harmonic of a plurality of harmonics associated with the voltage generated by the PMG after passive rectification and generate a compensation signal based on the PMG electrical angle and the voltage of the DC bus.

In addition to one or more of the features described above, or as an alternative, further embodiments may include that the voltage ripple compensation signal is a summation of voltage compensation signals for each harmonic of a plurality of harmonics selected.

In addition to one or more of the features described above, or as an alternative, further embodiments may include that the PMG is a three phase generator and the passive rectifier is a six-pulse rectifier.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
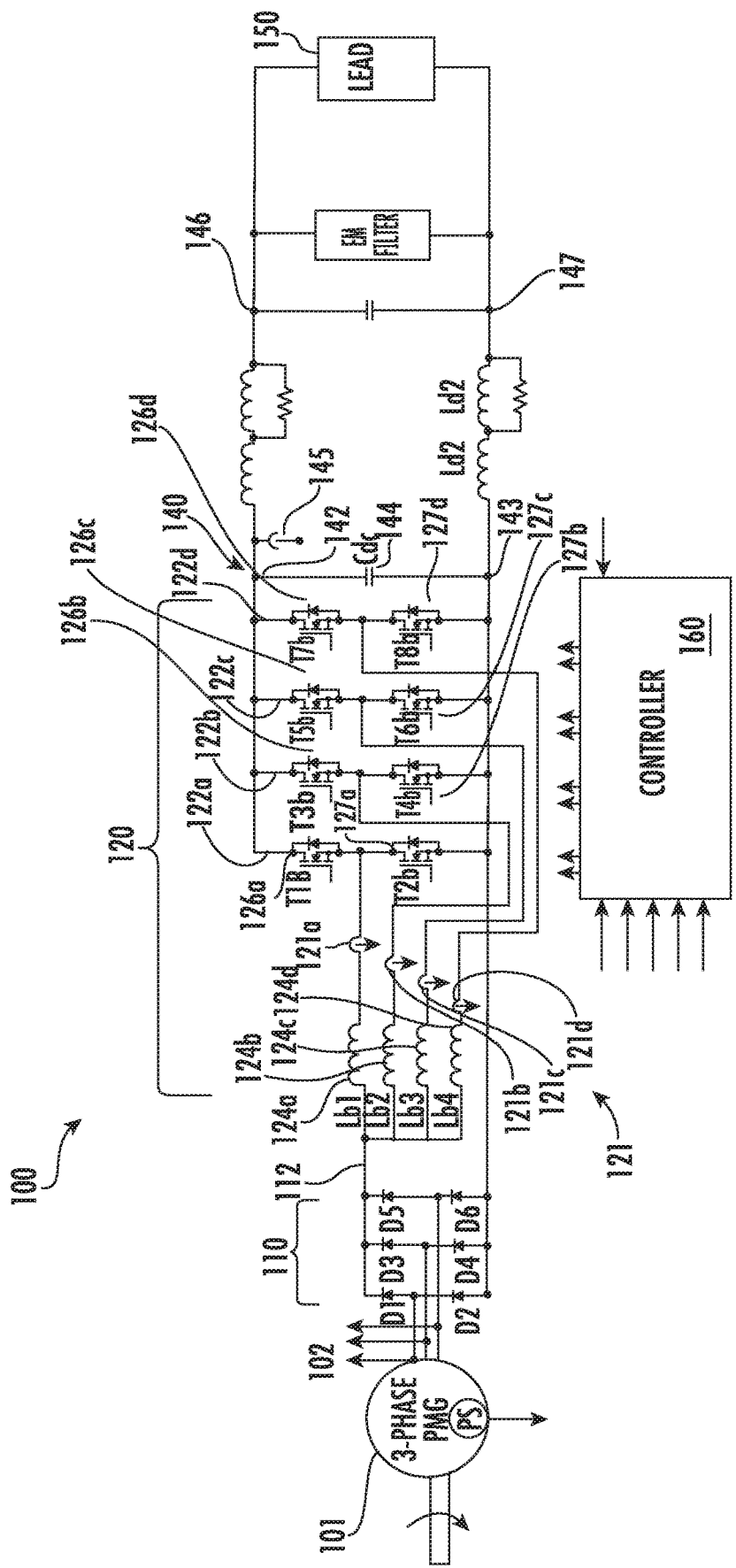
FIG. 1 depicts a block diagram of an electric power generating system with interleaved boost converter and voltage ripple compensation in accordance with one or more embodiments of the present disclosure.

Embodiments described herein are directed to a system and method DC power generating system for a high voltage DC bus, with example embodiments being discussed below in detail. According to example embodiments, technical benefits and improvements in voltage ripple compensation through active control and compensation. In addition, the voltage ripple compensation of the described embodiments reduces requirements with regard to the size of a DC link capacitor and filtering within the DC power generating system, resulting in improved weight, size and cost for the system.

A detailed description of one or more embodiments of the disclosed apparatus and method are presented herein by way of exemplification and not limitation with reference to the Figures. As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa"

and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. The term "about" is intended to include the degree of error associated with measurement of the particular quantity based upon the equipment available at the time of filing the application. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Turning to FIG. 1, a DC power system is shown. The DC power system 100 may be a power system of a vehicle, for example, a car, truck, or other ground vehicle, aircraft, and the like. As illustrated, the system 100 includes a variable speed three-phase permanent magnet generator (PMG) 101. The PMG 101 is mechanically driven by a prime mover (not shown) and generates a three-phase alternating current (AC) output as is conventionally known. The system 100 may include a voltage sensor(s) 102 in communication with each phase output of the PMG 101. The voltage sensor 102 is configured to provide voltage feedback signals for each phase output of the PMG 101 for the purpose of determining PMG electrical angle. In an embodiment the PMG electrical angle may be determined by a Hall-effect sensor that is operably connected to and configured to communicate with a system controller as described herein.

The system 100 further includes a conventional rectifier 110 in electrical communication with PMG 101. The rectifier 110 includes a plurality of diodes denoted as D1, D2, D3, D4, D5, and D6 to rectify the AC voltages from the PMG 101 to pulse rectified DC voltage 112. It will be appreciated that while the rectifier 110 is depicted and employs conventional diodes D1-D6, other configurations are possible, including, but not limited to active rectification, employing active switching devices and the like.

The system 100 further includes a multi-leg interleaved DC-DC boost converter 120. The each leg 122 (depicted as 122a-122d) of the boost converter 120 comprises a series boost inductor 124 (depicted as 124a-124d) operably connected to the mid-point of two series connected switching devices 126, 127 (depicted as 126a-126d and 127a-127d respectively). The current from the pulse rectified DC voltage 112 of the PMG 101 is passed to the boost inductor 124a-124d of each leg 122a-122d of the boost converter 120 through the inductances 124 to each leg 122. The switching devices 126 and 127 are each responsive to a pulse-width modulated (PWM) signals configured to synchronously rectify and convert the pulse rectified voltages 112 from the PMG 101 to DC voltages to supply a DC bus 140. In accordance with an embodiment, the pulse-width modulated signal of each phase of the DC-DC boost converter is phase shifted (interleaved) by 360 deg/n, where n is a number of phases of DC-DC boost converter. The interleaving reduces ripple current being directed to the load at the PWM switching frequency. In one example, the boost converter 120 converts the rectified three-phase voltage 112 into 270 volts DC output power at a DC bus 140. In another embodiment the DC bus 140 is 28 VDC and may also charge a battery and the like. The boost converter 120 further includes a plurality of current transducers 121a, 121b, 121c, and 121d configured to provide current feedback associated with each phase leg 122 of the boost converter 120. The current transducers 121a, 121b, 121c, and 121d are arranged at input portions of respective pairs of switching devices 126a-126d and 127a-127d respectively.

In an embodiment the DC bus 140 includes a positive terminal 142 and a negative terminal 143. The DC bus 140 may also include one or more DC bus capacitors 144 connecting the positive and negative terminals 142 and 143 of the DC bus 140. The DC bus 140 further includes a voltage sensor 145 coupled in parallel across the DC capacitor 144. The voltage sensor 145 is configured to provide voltage feedback for the boost converter 120. The boost converter 120, and DC bus 140 may further include filter inductors denoted LF1 and LD1 arranged serially from the first terminal 142 to a first output terminal 146 of the DC bus 140, and inductors LF2 and LD2 arranged serially from the second terminal 143 to a second output terminal 147 of the DC bus 140. In an embodiment, resistors RD1 and RD2 may further be arranged in parallel communication with inductances LD1 and LD2, respectively. Furthermore, a filter capacitor CF may be arranged across the first output terminal 146 and second output terminal 147 of the DC 140 bus. The filter inductors LF1, LD1, LF2, LD2, resistors RD1 and RD2 operably cooperate with filter capacitor CF to provide further voltage ripple and EMI reduction at the output of the DC voltage bus 140. Additional EMI filtering may also optionally be employed as depicted in the figure.

The system 100 further includes load 150 in communication with the output terminals 146/147 of DC bus 140. The load 150 may be any suitable DC load applied to the output DC bus 146/147. For example, as described above, the DC load 150 may be constant power DC load.

Figure 2:
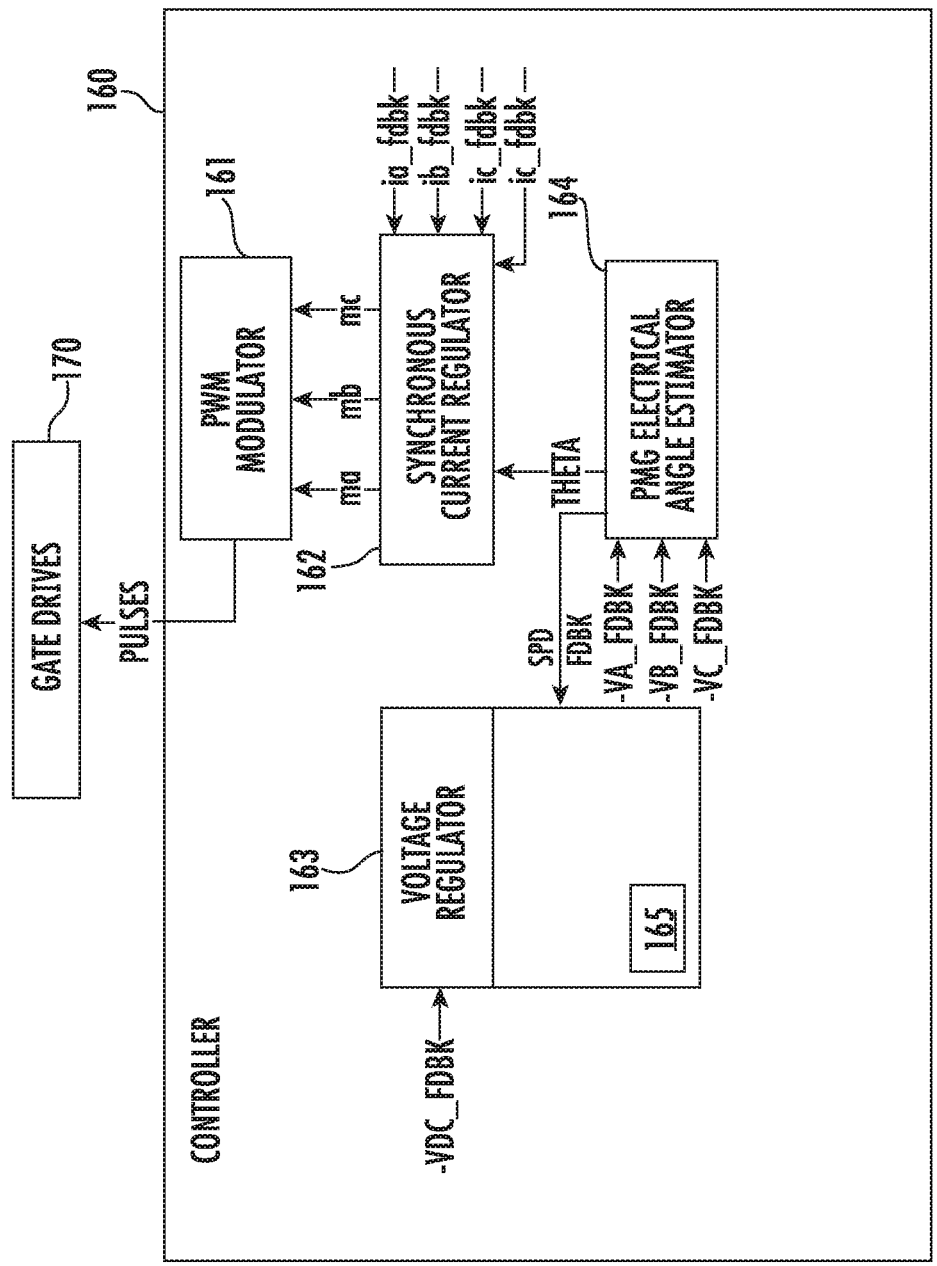
FIG. 2 depicts a simplified control diagram a voltage regulation function for the electric power generation system in accordance with one or more embodiments of the present disclosure.
Figure 3:
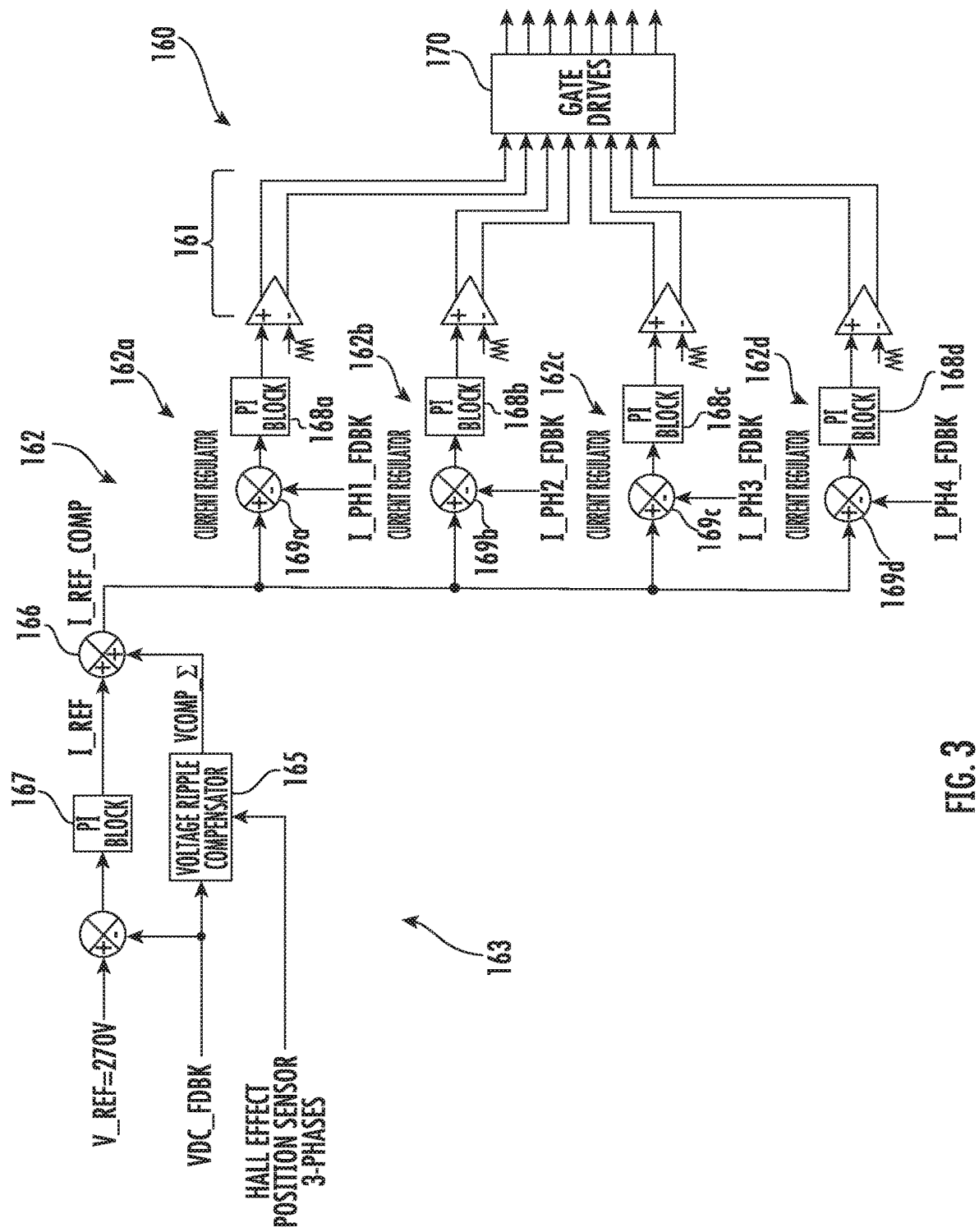
FIG. 3 depicts a simplified control diagram a voltage ripple compensation function on for the electric power generation system in accordance with one or more embodiments of the present disclosure.

Turning now to FIG. 2 and FIG. 3 as well. FIG. 2 depicts a simplified block diagram of the functions and interfaces of the controller 160. FIG. 3 depicts additional function detail of the functions of the controller 160. The system 100 optionally includes the gate drives 170 in communication with the switching devices 126a-d and 127a-d of the boost converter 120. The gate drives 170 may be configured to open and close each of the plurality of switching devices 126a-d and 127a-d in accordance with a selected gate control scheme to cause the boost converter 120 to synchronously rectify and convert the pulse rectified voltages 112 to generate the DC voltages of DC bus 140. The system 100 further includes controller 160 in communication with the gate drives 170 and/or the switching devices 126a-d and 127a-d and applies a pulse width modulated (PWM) signal to the gate drives 170 or switching devices 126a-d and 127a-d to implement the conversion.

In an embodiment the controller 160 further includes various processes and function configured to implement the functionality of the boost converter 120. In an embodiment the controller 160 includes a PWM modulator function 161 configured to provide the PWM signal(s). The outputs of PWM function 161 are connected to the MOSFET gates of the switching devices 126a-126d and 127a-127d respectively via gate drive 170. In operation, the controller 160 also includes a current regulation function 162 that operates in communication with a PWM function 161 to generate the PWM signals that control the gate drives 170 or switching devices 126a-d and 127a-d in response to the voltage regulator output signal I_ref_comp. For example, the current regulator function 162 may be in in operable communication with the plurality of current transducers 121a-121d to control the function of the boost converter 120 and supply the DC bus 140 and ultimately the load 150. In an embodiment the current regulator 162 includes a plurality of current regulators denoted 162a-162d, one for each of the legs 122a-122d of the boost converter 120.

In an embodiment the each regulator function 162a-162d includes a summer 169a-169d for each current regulator 162a-162d to receive a compensated current reference denoted as I_ref_comp and each feedback current as sensed by the current transducers 121a-121d. A current error signal is then directed to a proportional integral (PI) controller denoted 168a-168d respectively for each current regulator 162a-162d (FIG. 3) employed to monitor the voltage of the DC bus 140 and generate a reference command for the current regulator function 162.

The controller 160 further includes voltage regulator function 163 in communication with the current regulator function 162. For example, the voltage regulator function 163 of the controller 160 may be in operable communication with the voltage sensor 145 of the boost converter 120 and more specifically the DC bus 140. The voltage regulator function 166 monitors the sensor 145 and provides a current reference to control the synchronous current regulator function 162, and there by the boost converter 120 (via the switching devices 126a-d and 127a-d to maintain the voltage on the DC bus 140 at a prescribed level. In an embodiment the voltage regulator function 163 includes a proportional integral (PI) controller 167 (FIG. 3) employed to monitor the voltage of the DC bus 140 and generate a reference command for the current regulator function 162.

The controller 160 further includes PMG electrical angle estimator function 164 in communication with the voltage regulator function 163, the current regulator function 162, and the voltage sensor 145. The PMG electrical angle estimator function 164 may be configured to estimate an electrical angle of PMG 101, and provide the estimation to current regulator 162. Furthermore, the PMG electrical angle estimator 164 may be configured to estimate a rotational speed of the PMG 101 and provide the speed estimation to the voltage regulator function 163 as is known in the art.

Continuing with FIG. 2, and turning now to FIG. 3 as well, where further detail of the functions of the controller 160 are depicted. The voltage regulator function 163 of the controller 160 also includes a voltage ripple compensator function 165. The voltage ripple compensator 165 provides compensation to the current reference established in the voltage regulator 163 as described in further detail herein. For example, in an embodiment, the output of the voltage ripple compensator function 165 is added at summer 166 to the output of PI controller 167 in the voltage regulator function 163 to form a modulated current reference applied to current regulator(s) 162. In an embodiment, the set of current regulators 162, that is, one current regulator denoted as 162a-162d is employed to control each phase leg 122a-122d respectively. In operation, the PI controllers 168a-168d provides control inputs to cause the current regulators 162a-162d to control the voltage on the DC bus 140. Furthermore, the voltage compensation function 165 provides compensation inputs to the current regulators 162a-162d to cancel or reduce voltage ripple on the DC bus 140 as will be described in further detail herein. Furthermore, the carrier signal of each of the current regulator pulse-width-modulator (PWM) is phase shifted in relationship with the next one (interleaving). In an embodiment the phase shifting is based on the number of legs 122 employed in the boost converter 120. That is, to facilitate the interleaving the control of the current regulator(s) are phase shifted by 360/n where n is the number of phase legs 122 employed in the boost converter 120. In an embodiment employing four phase legs 122a-122d as described, the PWM carrier for each phase leg 122a-122d is shifted by 90 degrees respectively.

Figure 4:
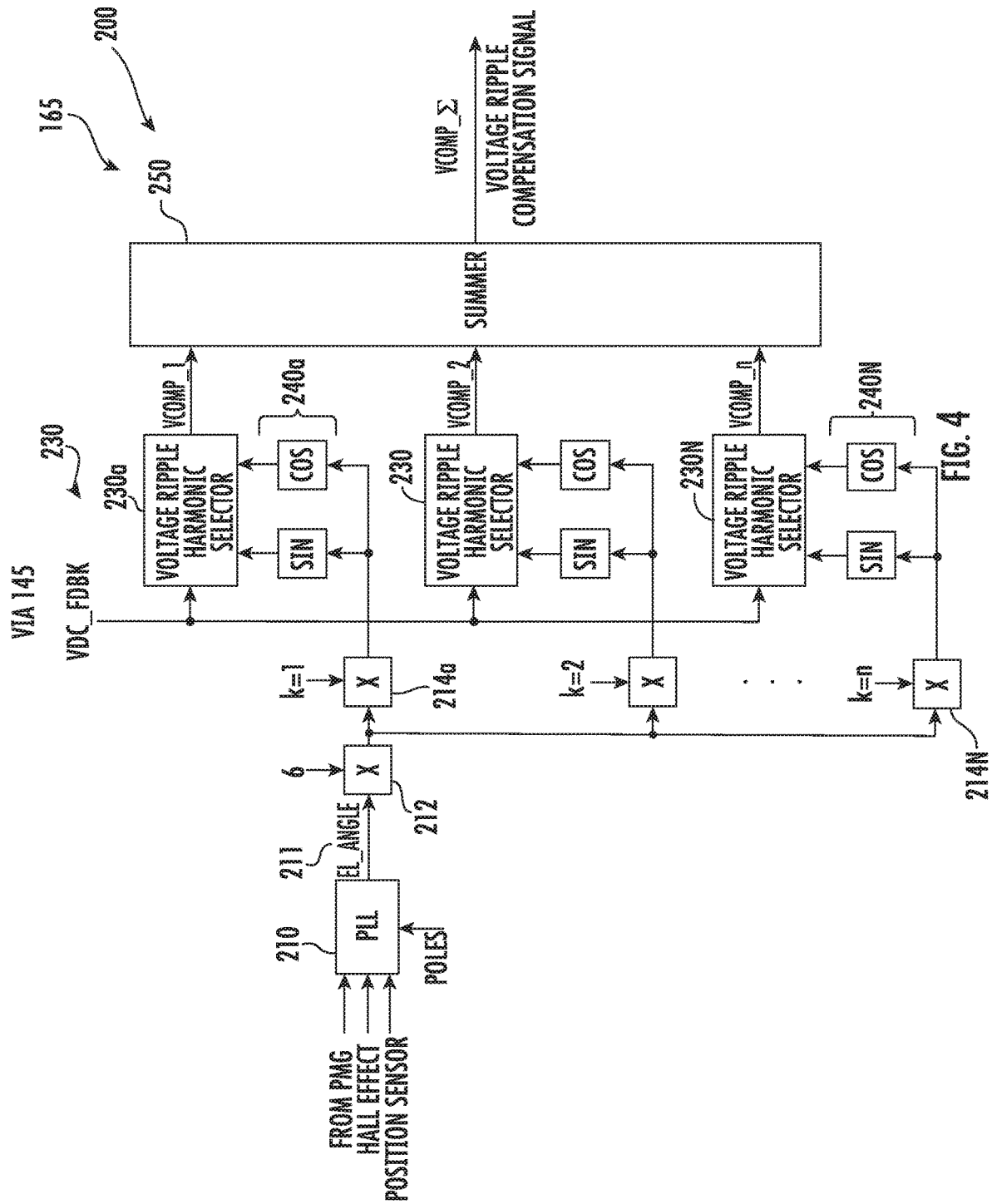
FIG. 4 depicts a simplified control diagram a voltage ripple harmonic compensation function of the voltage ripple compensation function for the electric power generating system in accordance with one or more embodiments of the present disclosure.

FIG. 4 depicts a further detailed diagram of a voltage ripple compensation function 165 also denoted as 200. In an embodiment, the voltage ripple compensation function 165, 200 includes a phase-locked-loop (PLL) 210 and a set of voltage ripple harmonic selectors 230. The PLL 210 facilitates synchronization with the ripple generated by the rectification of the PMG voltages. The PLL 210 receives rotor position signals for the three phase PMG 101 derive the rotary position of the PMG 101. The rotary position is then converted to an electrical angle 211 by multiplying by the number of pole-pairs in the PMG 101 as depicted in the PLL 210. The electrical angle 211 for the PMG 101 is then multiplied by six at multiplier 212. Multiplication by six facilitates identification and selection of the voltage ripple that is equal 6-times of fundamental PMG frequency (as generated by the 6-pulse rectifier 110). The derived signal 213 is multiplied a number (k=1, 2 . . . n) at multiplier 214 (referenced specifically as 214a-214n) corresponding to the harmonic (e.g., fundamental, $2^{nd}$, $3^{rd}$ etc.) of the voltage ripple on the voltage of the DC bus 140 to be compensated or reduced. The direct and quadrature vector components of the input vector (signal Vdc_fdbk) are formulated in a quadrature generator [sin(kωt) and cos(kωt)] 240a-240n by utilizing sin and cos functions.

Figure 5:
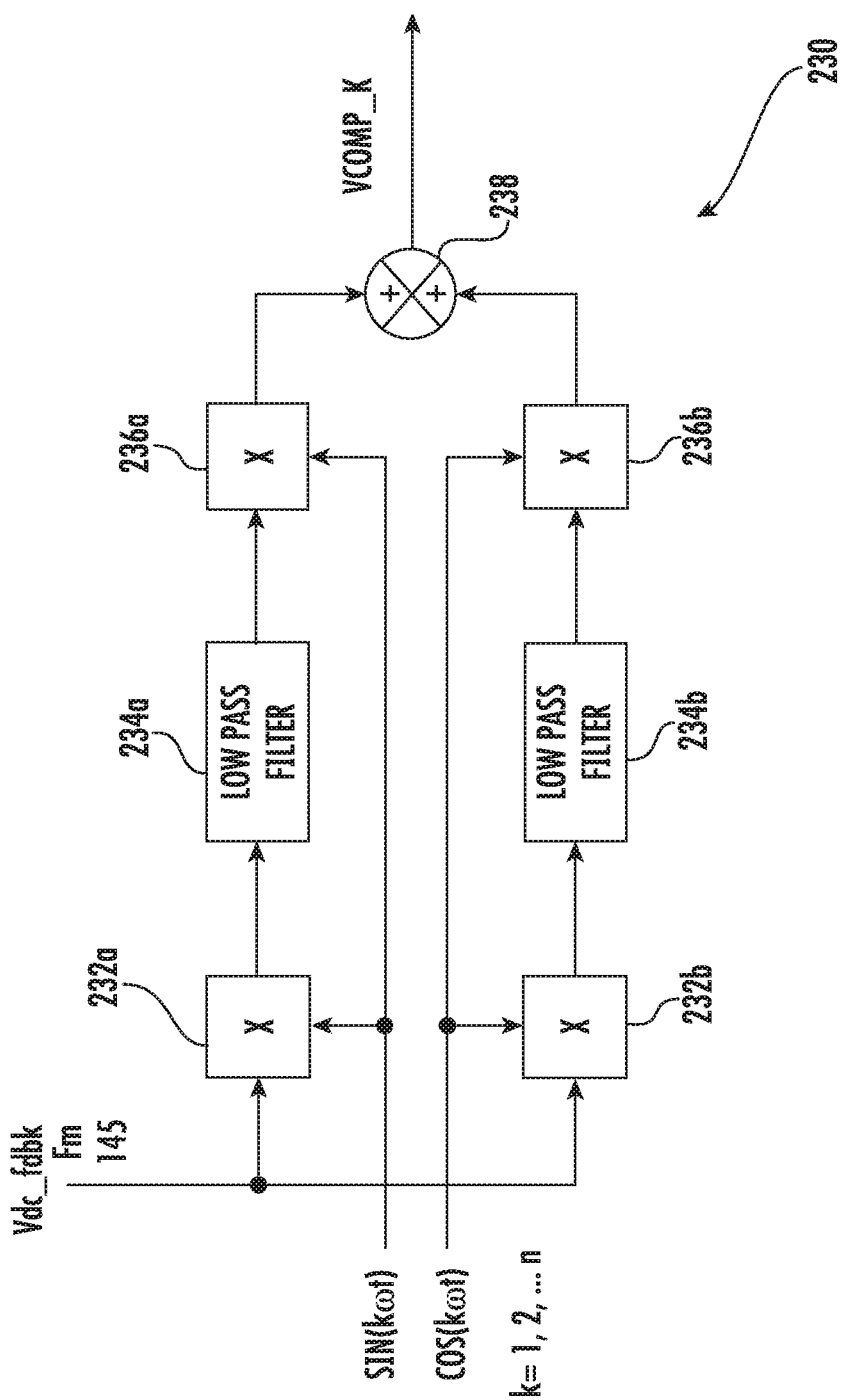
FIG. 5 depicts a simplified control diagram a voltage ripple harmonic selector of the voltage ripple compensation function for the electric power generating system in accordance with one or more embodiments of the present disclosure.

Turning now to FIG. 5, where a further detailed representation of the voltage ripple harmonic selector 230 is depicted. In an embodiment, the DC bus voltage signal (Vdc_fdbk) as measured by sensor 145 is applied to input of voltage ripple harmonic selectors 230 denoted 230a-230n. The quadrature signals (sin(kωt) and cos(kωt)) corresponding to a particular harmonic k are applied to a particular voltage ripple harmonic selector 230a-230n respectively. The direct and quadrature vector components e.g., (corresponding to sin and cos) of the input vector (signal Vdc_fdbk) of the quadrature generator [sin(kωt) and cos(kωt)] for the selected frequency are selected as dc quantities at the outputs of first multipliers denoted 232a and 232b. The high frequency components are filtered out by low pass filters 234a and 234b, and d-q vector components are applied to the second set of multipliers 236a and 236b. The second inputs of the second set of multipliers 236a, 236b are also connected to the input quadrature generator signals. The products are then added together at summer 238. The resulting time-varying signal formed at the summer output 238 and has amplitude, frequency, and phase of the selected harmonic of the dc link voltage ripple. The output of each particular voltage ripple harmonic selector 230a-230n produces a compensation signal (denoted Vcomp_1-Vcomp_n) associated with each harmonic k selected for compensation. Each of the compensation signals Vcomp_1-Vcomp_n is added at the output summer 250 (FIG. 4) to formulate a voltage ripple compensation signal as discussed with respect to FIG. 3.

Figure 6:
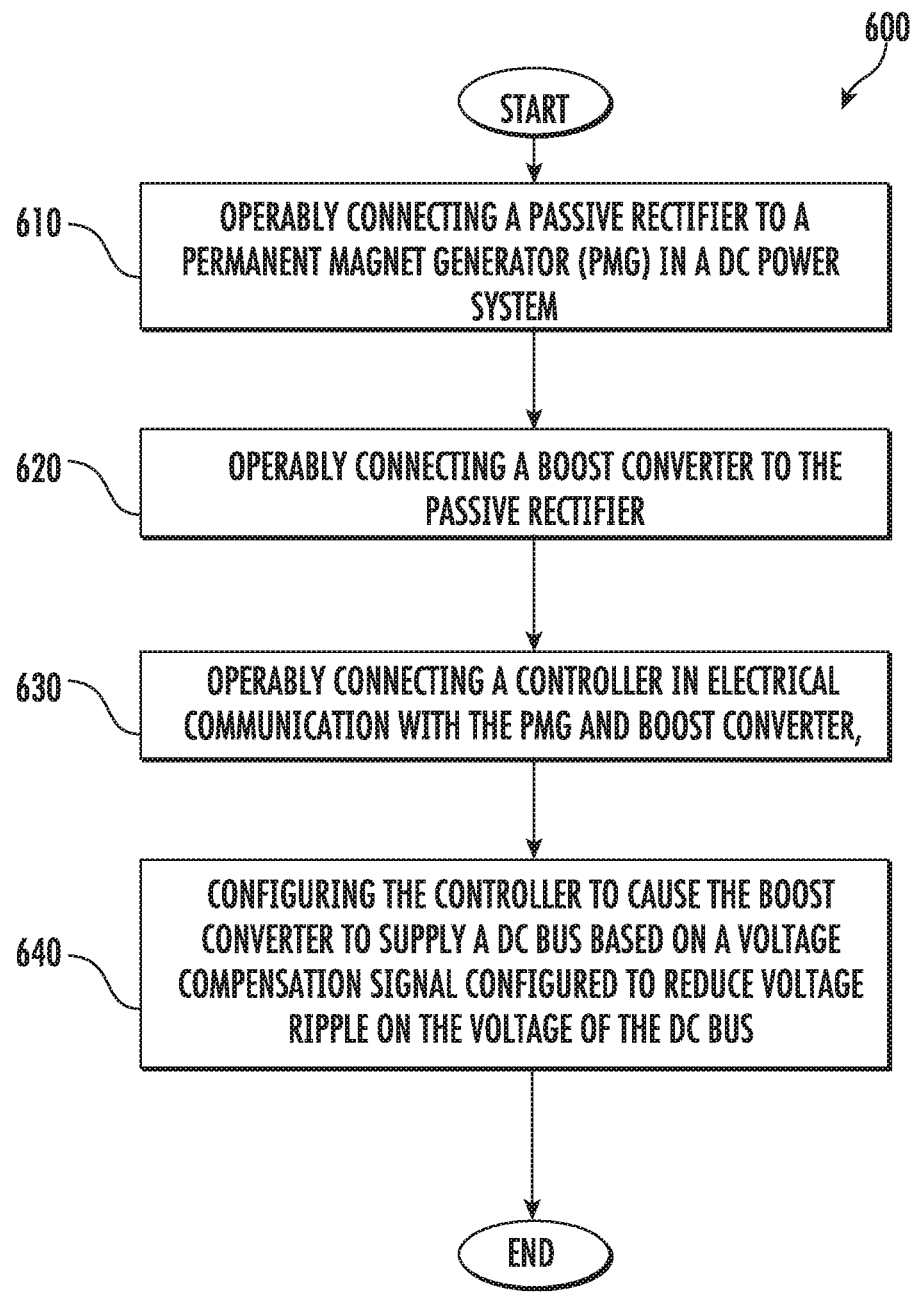
FIG. 6 depicts a method of voltage ripple compensation in a DC power generating system in accordance with one or more embodiments of the present disclosure.

FIG. 6 depicts a method 600 of reducing voltage ripple in a DC power generation system 100 in accordance with one or more embodiments of the present disclosure. The method 600 includes operably connecting a passive rectifier 110 to the PMG 101 as depicted at process step 610. At process step 620, the method 600 continues with operably connecting a boost converter 120 to the passive rectifier 110. A controller 160 is operably connected in electrical communication with the PMG 101 and the boost converter 120 as depicted at process step 630. The controller 160 is configured to execute a process to cause the boost converter 120 to supply a DC bus 140 based on a voltage compensation signal to the boost converter 120 to reduce voltage ripple on the voltage of the DC bus 140 as depicted at process step 640.

The method 600 may also include the controller 160 including a current regulator function 162 (FIG. 2), where the current regulator function 162 is configured to provide a pulse width modulation (PWM) scheme to the boost converter 120 based on quadrature components of feedback voltage harmonics of the boost converter 120. Furthermore, the method 600 includes a voltage regulator function 163 in communication with the current regulator function 162, wherein the voltage regulator function 163 is configured to provide a compensated reference current to the current regulator 162. The method 600 may also include an electrical angle estimator function 164, the electrical angle estimator function 164 is configured to estimate the electrical angle of power generated at the PMG 101. The electrical angle estimator function 164 also communicates with the voltage regulator function 163, which provides quadrature components of a feedback voltage output harmonics as sensed by sensor 145 to the current regulator 162, the quadrature components of the feedback voltage output harmonics being based on the estimated electrical angle of the PMG 101 and the feedback voltage.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing voltage ripple compensation in a DC power generation system, the system comprising:
   a permanent magnet generator (PMG);
   a passive rectifier in operable communication with the PMG;
   a multi-phase interleaved DC-DC boost converter in operable communication with the passive rectifier; and
   a controller in electrical communication with the boost converter, wherein the controller is configured to cause the boost converter to supply a DC bus and wherein the controller is configured to control the boost converter based on a desired DC bus voltage and on a voltage compensation signal to the boost converter to reduce voltage ripple on a voltage of the DC bus, wherein the voltage compensation signal is based at least in part on d-q components of harmonics of a DC bus feedback voltage due to 6-pulse passive rectification;

wherein the controller includes a current regulator in electrical communication with the boost converter, and wherein the current regulator is configured to provide a current regulation scheme to the boost converter based on the desired DC bus voltage, the voltage compensation signal and at least one feedback current of the boost converter, wherein the controller further includes a voltage regulator in communication with the current regulator, wherein the voltage regulator is configured to provide a compensated reference current to the current regulator, wherein the controller further includes an electrical angle estimator in communication with the PMG and the current regulator, and wherein the voltage regulator is in communication with the electrical angle estimator, and wherein the voltage regulator is configured to provide quadrature components of the harmonics of the DC bus feedback voltage at the boost converter to the current regulator, the quadrature components of the feedback voltage output harmonics being based on the estimated electrical angle of the PMG and the feedback voltage.

2. The system of claim 1, wherein the controller further includes a pulse width modulation (PWM) modulator in communication with the current regulator and the boost converter, the PWM modulator configured to control the boost converter based on a compensated reference current and a current of the boost converter.

3. The system of claim 1, wherein the current regulator is configured to provide a current regulation scheme to the boost converter through regulation of the boost converter current.

4. The system of claim 1, wherein the current regulator is configured provide to a current regulation scheme to the boost converter based on proportional—integral of current errors of the of the boost converter.

5. The system of claim 1, wherein the voltage regulator comprises a phase locked loop configured to generate an electrical angle of the PMG based on a position sensor associated with the PMG and a number of pole-pairs in the PMG.

6. The system of claim 5 wherein the voltage regulator comprises a harmonic selector configured to select a harmonic or a plurality of harmonics on DC bus after passive rectification of the PMG output to be compensated.

7. The system of claim 5 wherein the voltage regulator comprises a voltage ripple harmonic selector, the voltage ripple harmonic selector configured to select a harmonic of a plurality of harmonics associated with the DC bus voltage generated by the passive rectification of the PMG output and generate a compensation signal based on the PMG electrical angle and the voltage of the DC bus.

8. The system of claim 7, wherein the voltage ripple compensation signal is a summation of voltage compensation signals for each harmonic of a plurality of harmonics selected.

9. The system of claim 1, wherein the PMG is a three phase generator and the passive rectifier is a six-pulse rectifier.

10. A method for providing voltage ripple compensation in a DC power generation system having a permanent magnet generator (PMG), the method including:

operably connecting a passive rectifier to the PMG;
operably connecting a multi-phase interleaved DC-DC boost converter to the passive rectifier; and
operably connecting a controller in electrical communication with the PMG and boost converter, wherein the controller is configured to execute a process to cause the boost converter to supply a desired DC bus output voltage and wherein the controller is configured to control the boost converter based on the desired DC bus output voltage and a voltage compensation signal to the boost converter to reduce voltage ripple on a voltage of the DC bus, wherein the voltage compensation signal is based at least in part on d-q components of harmonics of a feedback voltage harmonics on the DC bus caused by passive rectification of PMG output;

further including the controller executing a current regulator function, and wherein the current regulator is configured to provide a current regulation scheme to the boost converter based on the voltage compensation signal and at least one feedback current of the boost converter, wherein the controller further includes a voltage regulator function in communication with the current regulator function, wherein the voltage regulator function is configured to provide a compensated reference current to the current regulator, wherein the controller further includes an electrical angle estimator function, the electrical angle estimator function configured to estimate at least an angle of power generated at the PMG, and wherein the voltage regulator function communicates with the electrical angle estimator function, and the voltage regulator function provides the quadrature components of the harmonics of the feedback voltage at the boost converter to the current regulator, the quadrature components of the harmonics of the feedback voltage being based on the estimated electrical angle of the PMG and the feedback voltage.

11. The method of claim 10, further including a pulse width modulation (PWM) modulator function in communication with the current regulator and the boost converter, the PWM modulator function configured to control the boost converter based on a compensated reference current and a current of the boost converter.

12. The method of claim 10, further including configuring the current regulator function to provide a current regulation scheme to the boost converter through regulation of the boost converter current.

13. The method of claim 10, further including configuring the current regulator function to provide a current regulation scheme to the boost converter based on proportional—integral of current errors of the of the boost converter.

14. The method of claim 10, wherein the voltage regulator function comprises a phase locked loop configured to generate an electrical angle of the PMG based on a position sensor associated with the PMG and a number of pole-pairs in the PMG.

15. The method of claim 14 wherein the voltage regulator function comprises a harmonic selector configured to select a harmonic of a plurality of harmonics of a voltage generated by the PMG after passive rectification to be compensated.

16. The method of claim 14 wherein the voltage regulator function comprises a voltage ripple harmonic selector, the voltage ripple harmonic selector configured to select a harmonic of a plurality of harmonics associated with the voltage generated by the PMG after passive rectification and generate a compensation signal based on the PMG electrical angle and the voltage of the DC bus.

17. The method of claim 16, wherein the voltage ripple compensation signal is a summation of voltage compensation signals for each harmonic of a plurality of harmonics selected.

18. The method of claim 10, wherein the PMG is a three phase generator and the passive rectifier is a six-pulse rectifier.

* * * * *